United States Patent [19]

Kirwan

[11] Patent Number: 5,291,954
[45] Date of Patent: Mar. 8, 1994

[54] FRONT MOUNTED, FRONT FOLDING TOOL CARRIER BAR

[76] Inventor: Gerald R. Kirwan, 1018 Par St., O'Neill, Nebr. 68763

[21] Appl. No.: 932,937

[22] Filed: Aug. 21, 1992

[51] Int. Cl.$^5$ ............... A01B 49/00; A01B 73/00; A01B 59/04
[52] U.S. Cl. ............... 172/311; 172/273; 172/810; 172/395
[58] Field of Search ............... 172/443, 810, 273, 395, 172/327, 776, 311, 297, 417, 484, 456, 310, 457, 459, 624.5

[56] References Cited

U.S. PATENT DOCUMENTS

| | | |
|---|---|---|
| 2,962,104 | 11/1960 | Antici . |
| 4,117,893 | 10/1978 | Kinzenbaw . |
| 4,119,156 | 10/1978 | Wheeler et al. ......... 172/417 X |
| 4,180,282 | 12/1979 | Henning . |
| 4,211,287 | 7/1980 | Garrison . |
| 4,363,374 | 12/1982 | Richter et al. . |
| 4,579,179 | 4/1986 | Vachon . |
| 4,582,143 | 4/1986 | Pratt . |
| 4,658,911 | 4/1987 | Drever et al. . |
| 4,773,666 | 9/1988 | Koberlein et al. . |
| 5,113,956 | 5/1992 | Friesen et al. ......... 172/311 |

FOREIGN PATENT DOCUMENTS 2052239 1/1981 United Kingdom .

Primary Examiner—Clifford D. Crowder
Assistant Examiner—Paul C. Lewis
Attorney, Agent, or Firm—John A. Beehner

[57] ABSTRACT

A front folding tool carrier bar for agricultural applications includes a frame having opposite sides and having ground-engaging wheels mounter thereon. Mounted on the frame is a device for coupling the frame to a vehicle. Also mounted on the frame are a pair of forwardly folding wing bars having first and second ends, each of the first ends pivotally mounted on the frame such that the wing bars may pivot about a substantially vertical pivot axis between a forwardly folding transport position and a transversely extended working position. Each wing bar is pivotally mounted at opposite sides of the frame. For securing the wing bars in transversely extended working position, a pair of outrigger braces extend outwardly from the frame and are connected to opposite wing bars whereby the wing bars may be braced in working position. Mounted on each wing bar is at least one ground-engaging wheel. Finally, a device for pivoting the wing bars between the transport position and the working position is provided.

7 Claims, 7 Drawing Sheets

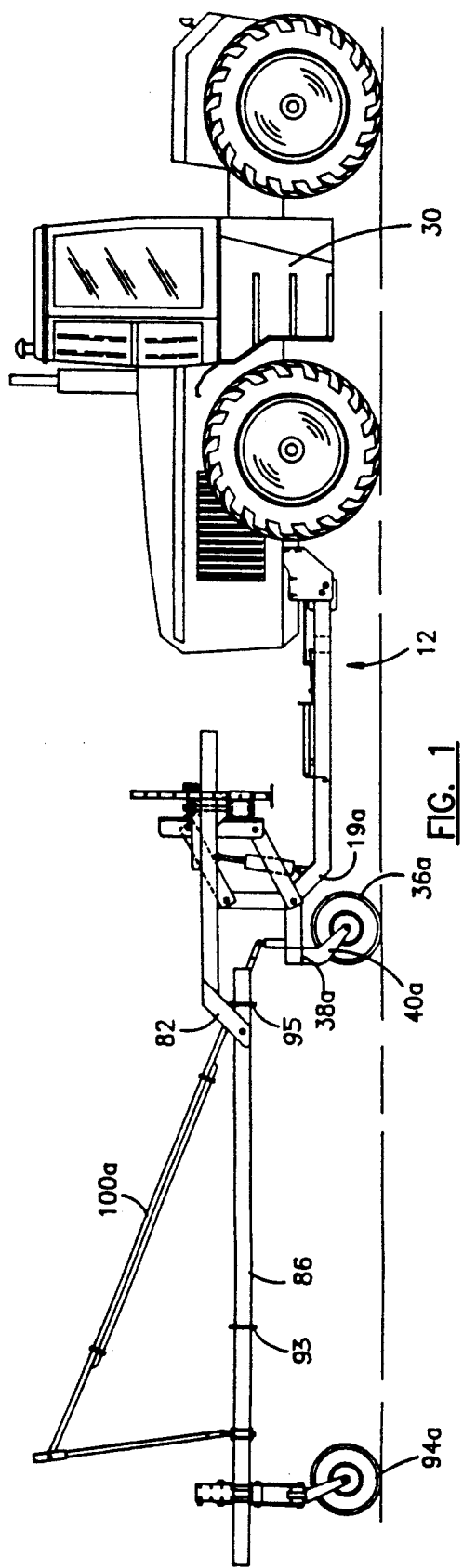
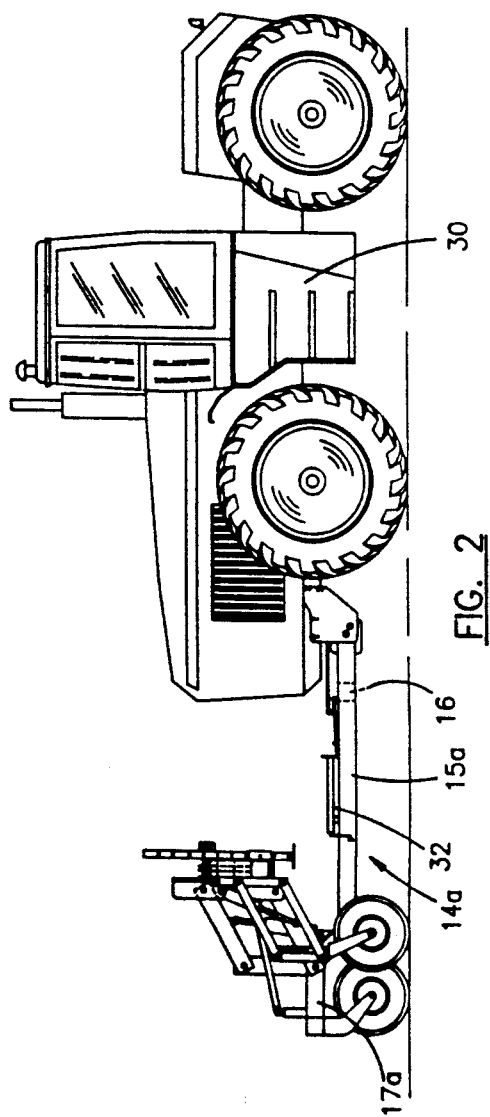

FRONT MOUNTED, FRONT FOLDING TOOL CARRIER BAR

BACKGROUND OF THE INVENTION

1. Technical Field

This invention relates to front folding agricultural implements and, more particularly, to a front folding tool carrier bar having a pair of forwardly folding wing bars pivotally mounted on a frame, and a pair of outrigger braces which act as rigid tensioning members when the wing bars are transversely extended.

2. Description of the Prior Art

Forwardly-folding agricultural implements are relatively widely known as one species of a class of implements that are transversely extended during operation but are forwardly folded for transport. The various advantages and disadvantages of each type have been discussed at length in previous patented art and need be only briefly elaborated upon here.

Several implement carriers taught by the prior art are front-mounted and forward-folding. For example, Drever et al, U.S. Pat. No. 4,658,911, and Antici, U.S. Pat. No. 2,962,104, both disclose forwardly folding implement carriers. However, Drever discloses a frame which is designed to be towed behind a tractor. Antici discloses a quick-hitch means for attaching a forwardly mounted agricultural implement to a tractor but requires substantial modification to the pushing device to accommodate the agricultural implement. There is therefore a need for a forwardly-mounted forwardly folding tool carrying bar which may be used with a variety of pushing devices.

It is therefore a primary object of the invention to provide an improved front folding tool carrier bar.

Another object of the present invention is to provide a front folding tool carrier bar which may be easily adjusted between a transversely extended working position and a forwardly folded transport position.

Yet another object of the present invention is to provide a forwardly folding tool carrier bar which may be rigidly secured in a transversely extended operating position by a pair of outrigger braces.

Still another object of the present invention is to provide a front folding tool carrier bar which has a vertical adjustment mechanism which may adjust the distance between the ground and the tool bar to allow for use of various agricultural implements.

Yet another object of the present invention is to provide a front folding tool carrier bar which has a quick-attach mechanism fitted thereon to allow for rapid engagement and disengagement of the tool carrier bar to a tractor.

Finally, an object of the present invention is to provide a front folding tool carrier bar which is relatively simple to manufacture, durable in construction and safe in use.

SUMMARY OF THE INVENTION

The present invention provides a front folding tool carrier bar for agricultural applications having a frame having opposite sides and including ground-engaging wheels mounted thereon. Mounted on the frame is a coupling device for coupling the tool carrier bar to a vehicle. Pivotally mounted on the frame are a pair of forwardly folding wing bars having first and second ends, each of the first ends pivotally mounted on the frame such that the wing bars may pivot about a substantially vertical pivot axis, between a forwardly folded transport position and a transversely extended working position. To brace the wing bars in the transversely extended working position, a pair of outrigger braces extend outwardly from the frame forward of the wing bars, one brace pivotally connected to each wing bar. The outrigger braces, furthermore, have pivot joints for mounting the braces to the frame and the wing bars. These pivot joints allow pivotal motion of the outrigger braces about a substantially vertical axis and about a substantially horizontal axis whereby the braces may be pivoted about the axes. Also, each of the outrigger braces has one or more center hinges formed in each brace such that each outrigger brace acts as a rigid tensioning member when the wing bars are in the working position, and each outrigger brace may be folded in response to the wing bars pivoting from the working position to the transport position.

Mounted on each wing bar is at least one ground-engaging wheel for supporting the wing bar above the ground surface. Also, a device for pivoting the wing bars between the transport position and the working position is provided.

The coupling device consists of a quick-attach coupling mechanism having one or more generally V-shaped notches formed at one end of the frame and one or more bar stops pivotally mounted on a forward end of each V-shaped notch. Each notch may thus receive a push bar of a vehicle which is held in the V-shaped notches by the bar stops.

Furthermore, the tool carrying bar may have a vertical adjustment mechanism mounted on the frame and the wing bars, whereby the distance between the ground and the wing bar may be adjusted. The vertical adjustment mechanism consists of at least one parallelogram type linkage mounted on each wing bar and a central parallelogram type linkage mounted on the frame. Therefore, the second ends of the wing bars may be raised or lowered in unison with the first ends of the wing bars.

The present invention thus provides a sturdily constructed front folding tool carrier bar for agricultural applications. As the outrigger braces may fold in response to the wing bars being moved from a transversely extended position to a folded position, an operator need not leave the tractor to fold the wing bars. Also, the outrigger braces are attached closer to the second ends of the wing bars, thus resulting in great rigidity for each wing bar. Furthermore, as the height of the tool carrier bar may be adjusted, a variety of agricultural implements may be used thereon. The present invention thus provides a substantial improvement over other such systems in the art.

BRIEF DESCRIPTION OF THE DRAWINGS

FIG. 1 is a side elevational view of the implement with the wing bars in the transport position.

FIG. 2 is a side elevational view of the implement with the wing bars in the working position.

DESCRIPTION OF THE PREFERRED EMBODIMENT

Figure 3:
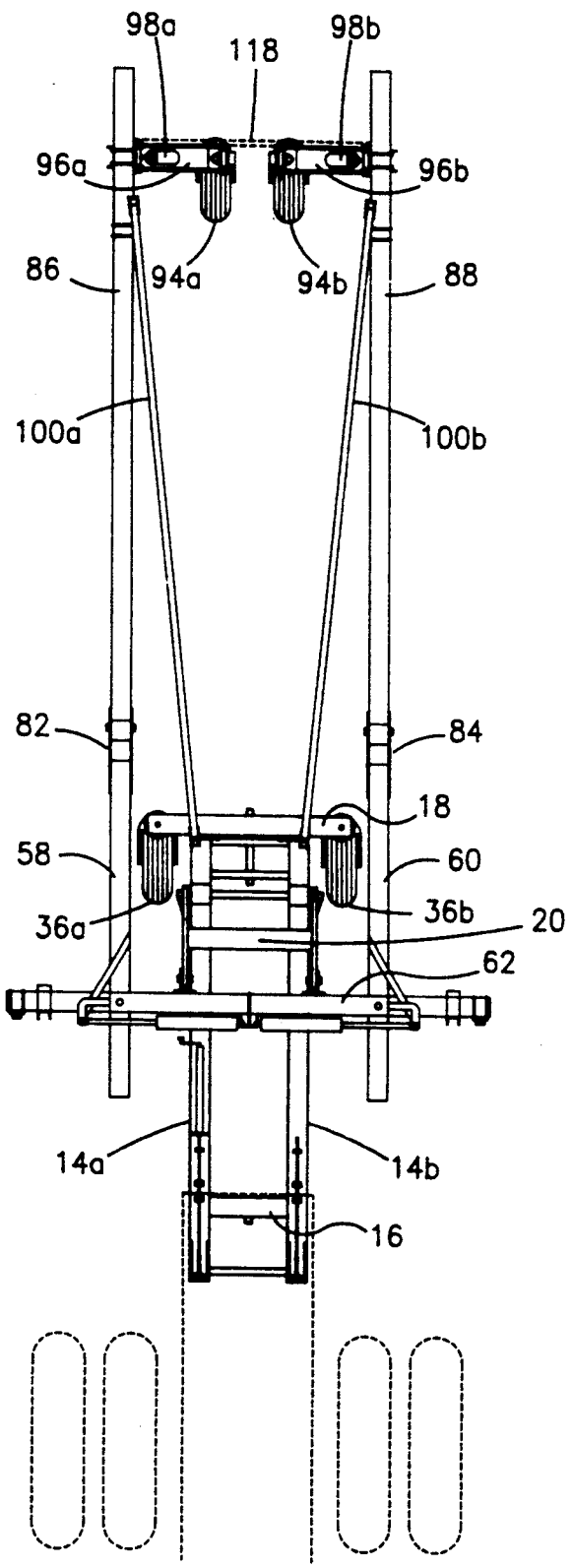
FIG. 3 is a top plan view of the implement with the wing bars in the transport position.
Figure 4:
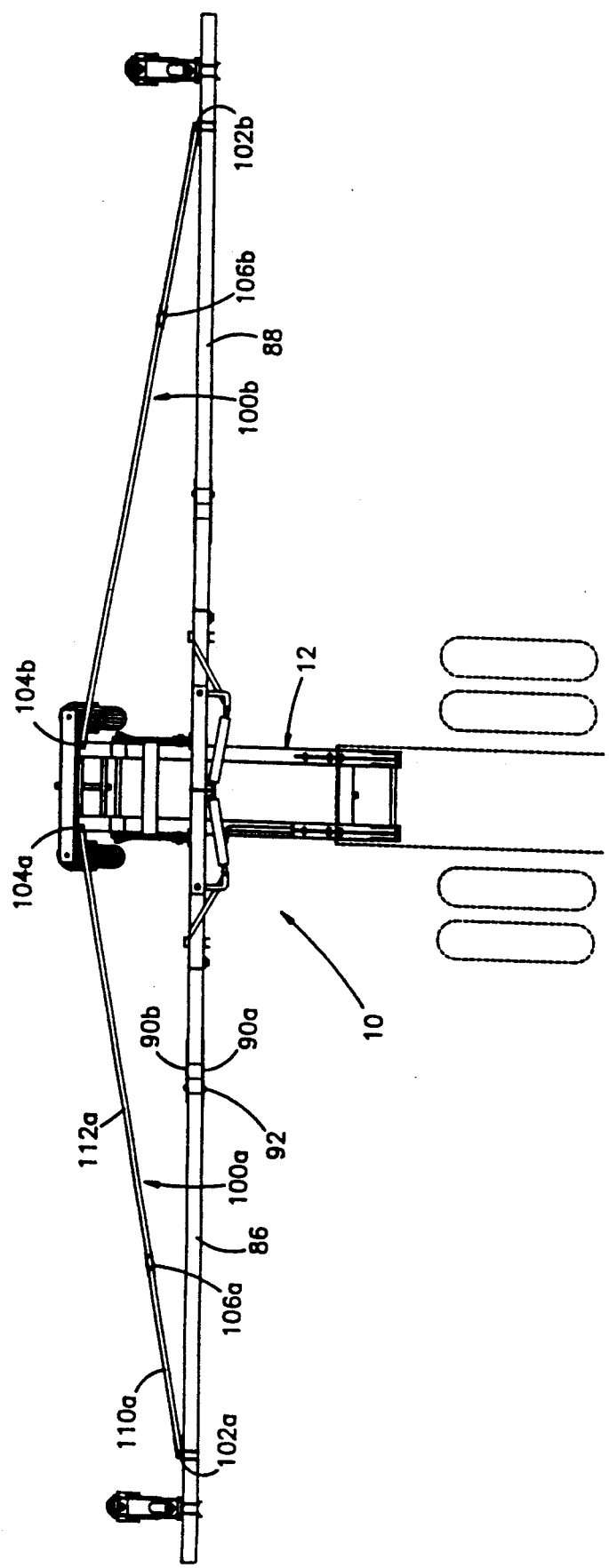
FIG. 4 is a top plan view of the implement with the wing bars in the working position.

The front folding tool carrier bar 10 is shown in its preferred embodiment in FIGS. 1-4 as including a frame 12 having a pair of longitudinal frame members 14a and 14b. Shown best in FIGS. 3 and 5, a rear cross member 16 extends between and is connected to the longitudinal frame members 14a and 14b on either side. Extending across and connected to the front of the longitudinal frame members 14a and 14b is front cross member 18 which extends outside of the longitudinal frame members 14a and 14b on either side of the frame 12. Positioned approximately one quarter of the length of the frame rearward from the front cross member 18 is a middle cross member 20 which provides additional frame rigidity. The longitudinal frame members 14a and 14b are preferably formed as shown in FIG. 1 as each including a lower section 15a and 15b, an upper section 17a and 17b and a middle connecting section 19a and 19b.

Figure 6:
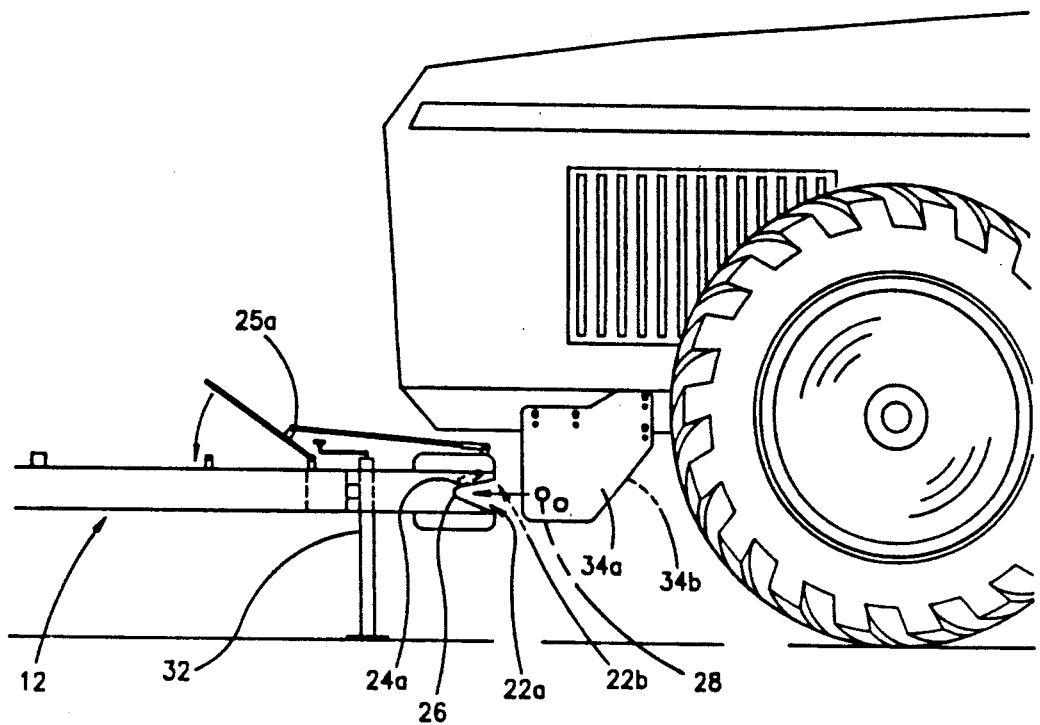
FIG. 6 is an enlarged partial side elevational view showing the quick-attach coupler prior to engagement.

Formed at the rearward end of the frame 12 at the rear ends of the longitudinal frame members 14a and 14b are a pair of V-shaped notches 22a and 22b and a pair of bar stops 24a and 24b, which together form a quick-attach coupling mechanism. The V-shaped notches 22a and 22b are shown in FIG. 6 as having a rounded V-base 26 into which a push bar 28 of tractor 30 may fit. The push bar 28 of the tractor 30 is secured in the V-base 26 by the bar stops 24a and 24b. Each bar stop 24a and 24b is preferably a block of metal pivotally mounted such that one edge of the block of metal acts as the axis of rotation. The bar stop 24a and 24b may be pivoted about the axis of rotation by a lever mechanism 25a and 25b, one mounted on each longitudinal frame member 14a and 14b. The bar stops 24a and 24b may pivot between an in FIG. 6, which allows a push bar 28 to enter a V-shaped notch 22a and 22b, and a closed position which secures the push bar 28 in the V-base 26 of each V-shaped notch 22a and 22b. The front folding tool carrier bar 10 may then be attached or disengaged from a tractor 30 with substantial speed and ease.

It is contemplated that the push bar 28 would be mounted on a tractor 30 by a pair of downwardly depending plates 34a and 34b mounted on the tractor frame. The push bar 28 then extends between and is connected to the downwardly depending plates 34a and 34b, thus providing a stable, rigid attachment point for the front folding tool carrier bar 10.

Figure 7:
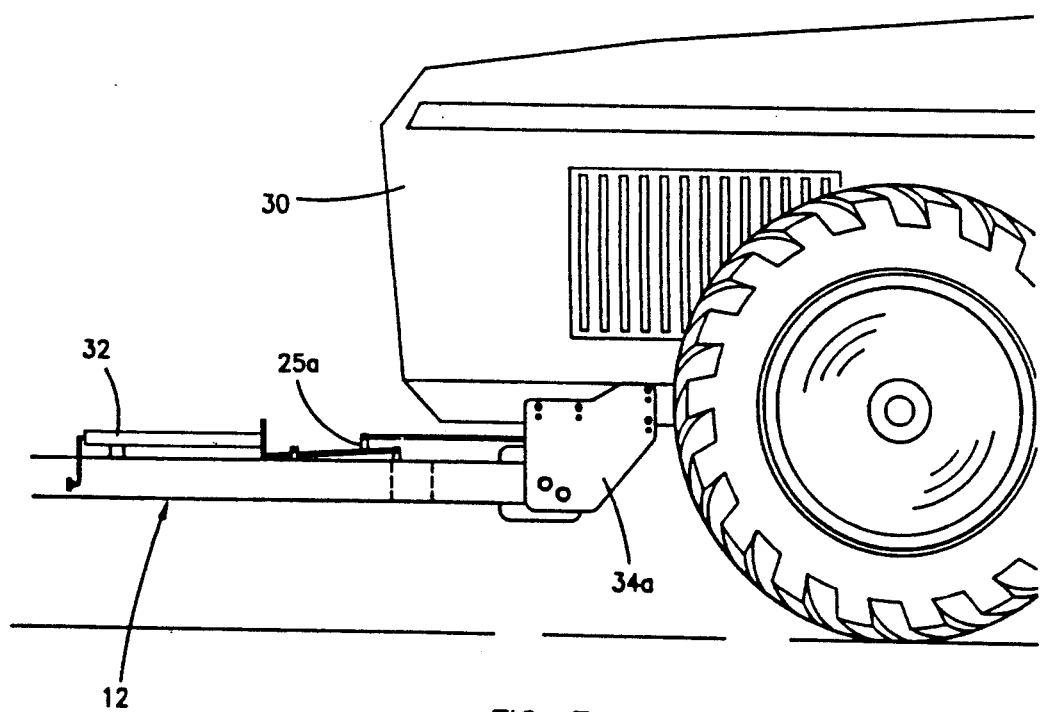
FIG. 7 is a side elevational view similar to FIG. 6, but with the quick-attach coupler engaged.
Figure 8:
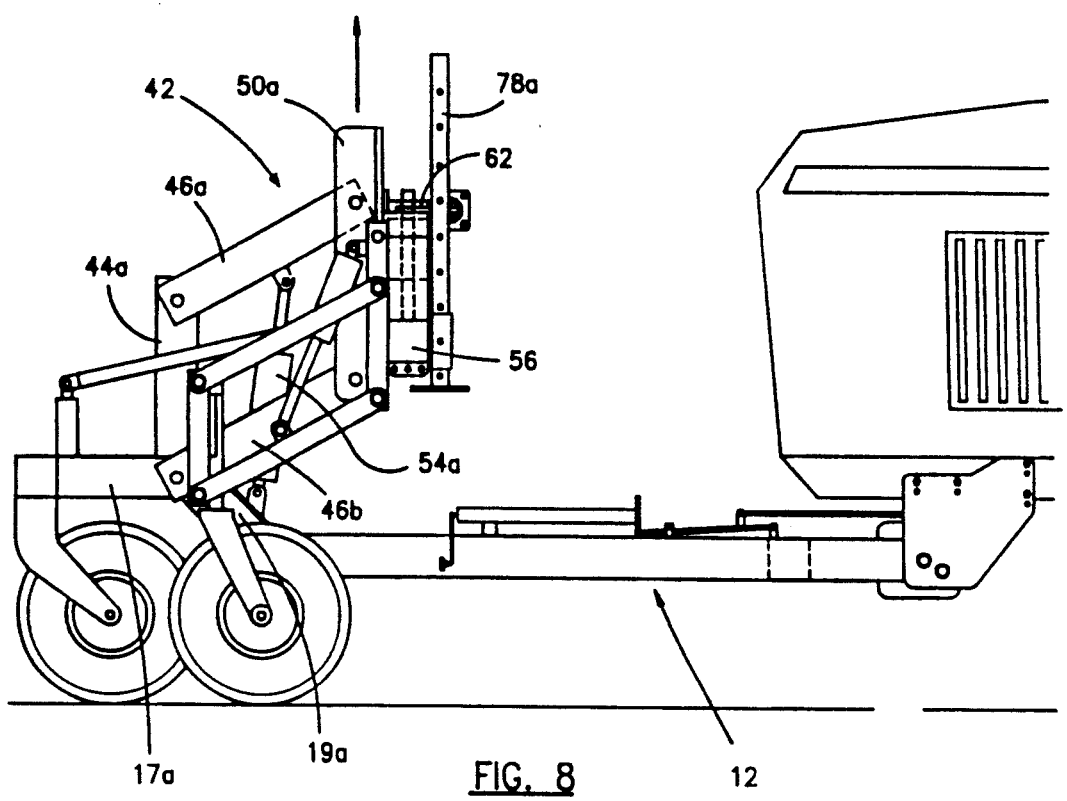
FIG. 8 is a partial side elevational view showing the center frame and wing bars in an elevated position.
Figure 9:
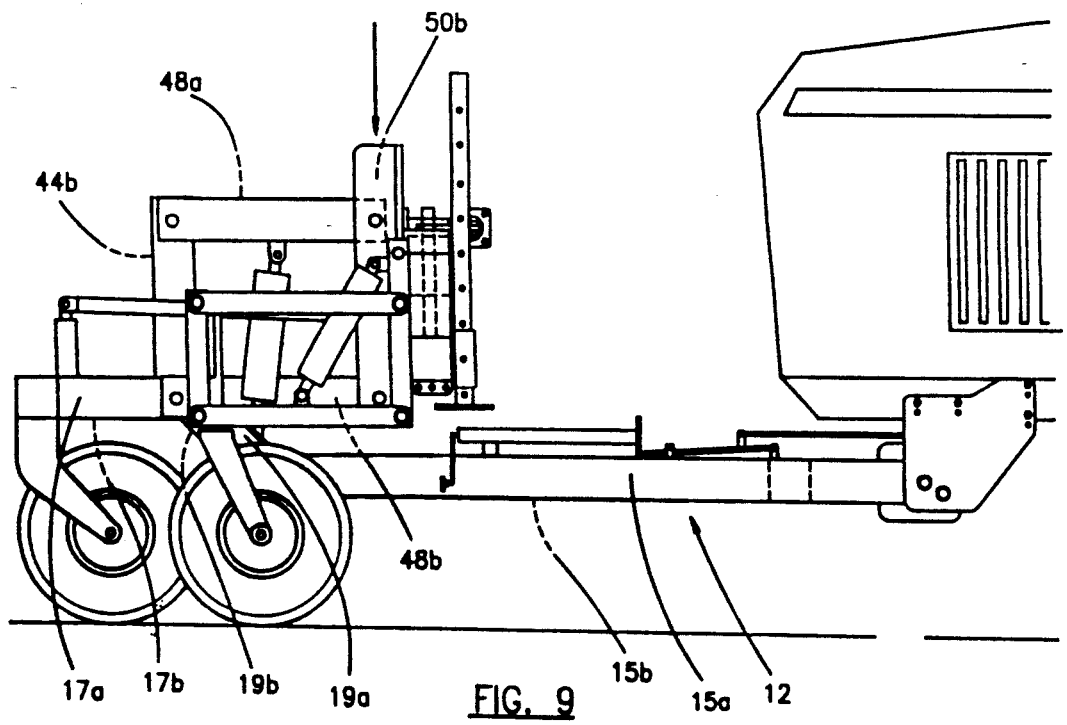
FIG. 9 is a partial side elevational view showing the center frame and wing bars in a lowered position.

For supporting the rear end Of the frame 12 in a raised position when disengaged from a tractor 30, a jack 32 is provided which supports the frame 12 as shown in FIG. 6. When not in use, the jack 32 may be stored in a storage position, shown in FIG. 7.

Mounted at opposite ends of the front cross member 18 are a pair of ground-engaging wheels 36a and 36b, which depend downwardly from the front cross member 18 and are mounted on castors 38a and 38b which allow for rotational motion of the wheel frame 40a and 40b about a substantially vertical axis, whereby the frame 12 may be more easily turned.

Mounted on the frame 12 rearward of the front cross member 18 is a parallelogram type linkage 42 which is preferably constructed as follows. A pair of vertical beams 44a and 44b are mounted to the frame 12 rearward of the front cross member 18 at the rear end of the upper sections 17a and 17b. Pivotally mounted on each vertical beam 44a and 44b are a pair of struts 46a, 46b, 48a and 48b. Struts 46a and 48a are preferably mounted adjacent the top of each vertical beam 44a and 44b, whereas struts 46b and 48b are mounted adjacent the base of each vertical beam 44a and 44b, respectively. Struts 46a and 46b are connected to a vertical adjustment member 50a, and struts 48a and 48b are connected to a similar vertical adjustment member 50b. The various struts and vertical beams and members are preferably connected to form a pair of parallelograms which are substantially parallel to one another. Extending between and connected to struts 46a and 48a is a horizontal member 52 which is rigidly secured to each strut. Extending upwardly from each middle section 19a and 19b of each longitudinal frame member 14a and 14b is a hydraulic cylinder 54a and 54b, each of which is connected to the horizontal member 52 to provide for vertical adjustment of the parallelogram type linkage 42.

Figure 5:
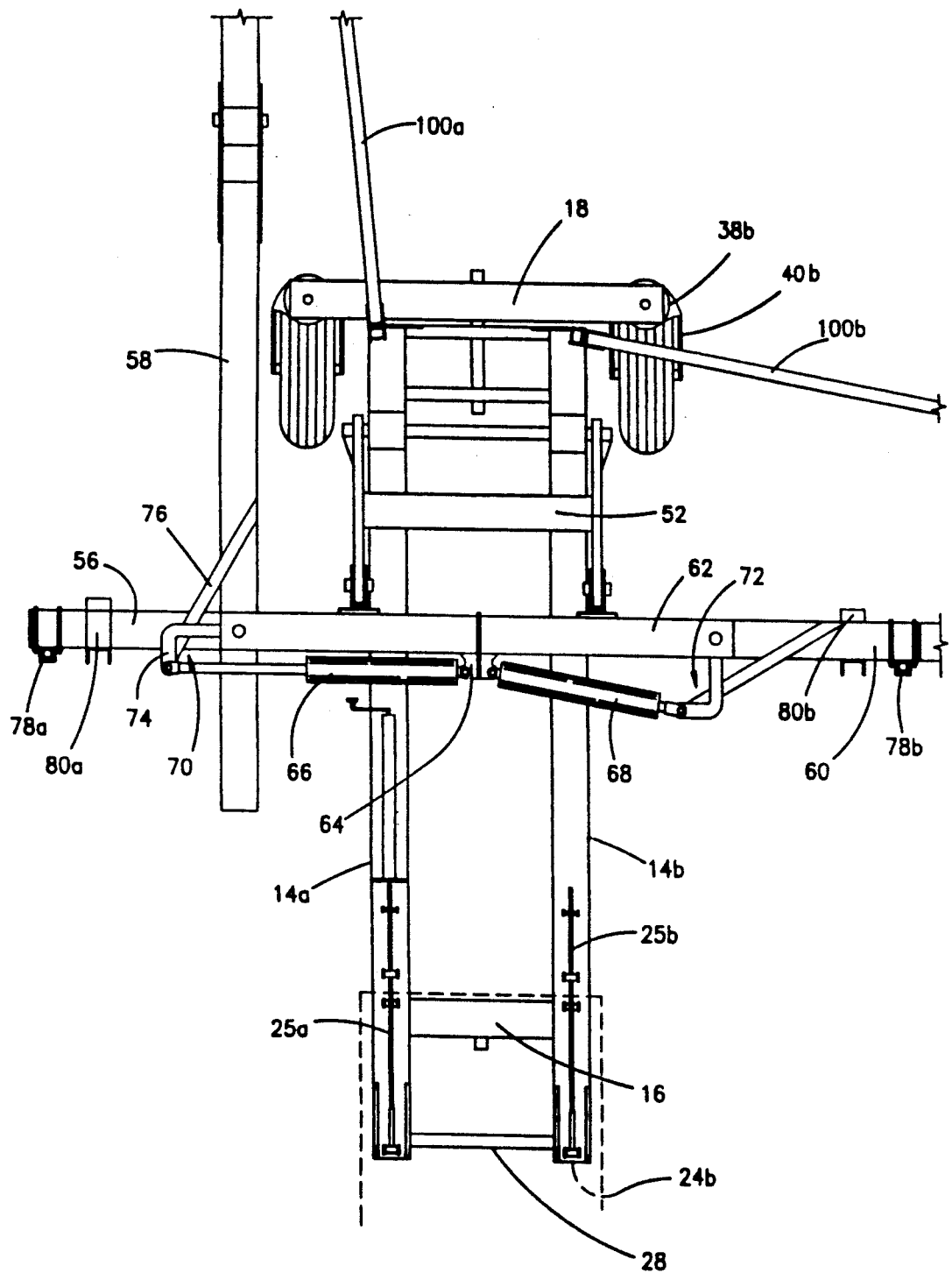
FIG. 5 is a detail plan view of the implement showing one wing bar in the transport position and one wing bar in the working position.

Mounted to the vertical adjustment members 50a and 50b in substantially horizontal alignment is a center tool bar 56 which extends substantially perpendicular to the longitudinal frame members 14a and 14b. The center tool bar 56 is preferably attached to the vertical adjustment members 50a and 50b towards the base of each member 50a and 50b. Pivotally mounted on the center tool bar 56 is a left wing bar 58 and a right wing bar 60. Each wing bar 58 and 60 is preferably mounted on top of the center tool bar 56 and is secured in place by a horizontal securement flat 62. Each of the wing bars 58 and 60 thus may pivot about a substantially vertical axis, as shown in FIG. 5. Mounted on a central rearward extension 64 of the securement flat 62 are a pair of oppositely extending hydraulic cylinders 66 and 68. To allow for increased torque about the pivoting axis of each wing bar 58 and 60, each wing bar 58 and 60 has a cylinder connection extension 70 and 72 extending outwards from each wing bar 58 and 60 as shown in FIG. 5. Each of the cylinder connection extensions 70 and 72 are similarly constructed, therefore description of the cylinder connection extension 70 likewise describes construction of cylinder connection extension 72. Cylinder connection extension 70 includes L-shaped strut 74 extending outwards from the left wing bar 58 adjacent the pivot point of the wing bar 58. For added support of the L-shaped strut 74, a support bar 76 extends from the outer section of the L-shaped strut 74 diagonally to the left wing bar 58 forwards of the pivot point of the wing bar 58. The left hydraulic cylinder 66 is connected to the outer end of the L-shaped strut 74, thereby creating greater torque for pivoting the left wing bar 58 about the pivot axis.

Each wing bar 58 and 60 may be pivoted between a transport position in which each wing bar 58 and 60 is substantially parallel to the longitudinal frame members 14a and 14b of the frame 12, and a transversely extended working position in which each wing bar 58 and 60 is aligned with the center tool bar 56.

Mounted adjacent opposite ends of the center tool bar 56 are a pair of adjustable tool bar supports 78a and 78b which may be extended downwards to contact a ground surface and there be secured to provide support for the tool bar 56 when the front folding tool carrier bar 10 is not in use. Also mounted adjacent opposite ends of the center tool bar 56 are a pair of wing bar supports 80a and 80b which are generally h-shaped metal structures which have a lower end fitting over the center tool bar 56 allowing for securement of each wing bar support 80a and 80b to the center tool bar 56. When the wing bars 58 and 60 are in extended position, each wing bar 58 and 60 is supported by a wing bar support 80a and 80b, as shown in FIG. 5.

Mounted on the outer end of each wing bar 58 and 60 is a wing bar extension connector 82 and 84 (FIGS. 1, 3), each of which is designed to accept and secure a wing bar extension 86 and 88. Each extension connector 82 and 84 is preferably constructed in the same manner, as including a pair of diagonally downwardly depending plates 90a and 90b (FIG. 4) mounted on opposite sides of each wing bar 58 and 60 adjacent the end of each wing bar 58 and 60. The depending plates 90a and 90b accommodate a wing bar extension 86 between the plates 90a and 90b, the wing bar extension 86 then being secured between the plates by a pivot pin 92 extending through the wing bar extension 86 and between the downwardly depending plates 90a and 90b such that the wing bar extension 86 may pivot about a substantially horizontal axis in response to various terrains encountered. Each wing bar extension 86 and 88 preferably extends outwardly in alignment with the wing bar 58 and 60 to which it is connected. The total length of each wing bar 58 and 60 and wing bar extension 86 and 88 combination may be adjusted by adjusting the length of the wing bar extension 86 and 88. In a preferred embodiment, this adjustment is accomplished by removing sections of the wing bar extensions 86 and 88 as at the vertical connection flanges 93 and 95 shown in FIG. 1.

Mounted adjacent the end of each wing bar extension 86 and 88 is a wing bar ground wheel 94a and 94b mounted on a castor similar to ground wheels 36a and 36b previously described. For adjusting the ground clearance of each end of the wing bar extension 86 and 88, each wing bar ground wheel 94a and 94b is mounted on a parallelogram type linkage 96a and 96b which functions in the same manner as the parallelogram type linkage 42 previously described. However, as the parallelogram type linkages 96a and 96b positioned on the end of each wing bar extension 86 and 88 do not require the same lifting force as the parallelogram type linkage 42, only a single hydraulic cylinder 98a and 98b for each linkage is needed.

The hydraulic system for operating the three parallelogram type linkages 42, 96a and 96b is preferably connected such that all three parallelogram type linkages 42, 96a and 96b raise or lower the center tool bar 56 and left and right wing bar extensions 86 and 88 in substantial unison. Hydraulic power is preferably supplied by the tractor 30 by means of connections which are well known to those skilled in the art.

Figure 10:
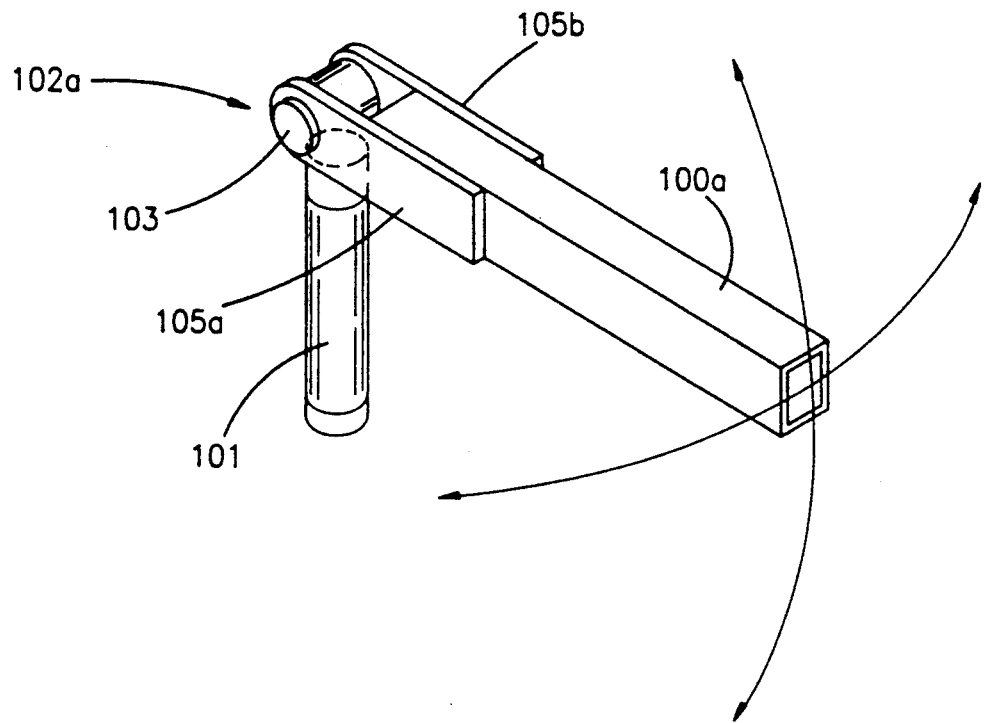
FIG. 10 is a detail partial perspective view of the pivot joints at opposite ends of the outrigger brace.

For stabilizing the wing bar extensions 86 and 88 in transversely extended working position, a pair of outrigger braces 100a and 100b extend between the outer portion of each wing bar extension 86 and 88 and the upper frame section 17a and 17b of the frame 12. Each outrigger brace 100a and 100b is connected to the respective Wing bar extension 86 and 88 by a pivotal joint 102a and 102b which allows pivotal motion of an outrigger brace 100a and 100b about a substantially vertical axis and about a substantially horizontal axis as shown in FIG. 10. Similarly, a pivotal joint 104a and 104b is mounted between the outrigger brace 100a and 100b and the upper frame section 17a and 17b allowing for a motion similar to that described in connection with pivotal joint 102a and 102b. Pivot joints 102a, 102b, 104a and 104b are all constructed in substantially the same manner, each having a pivot rod 101 mounted on the frame 12 or wing bar extension 86 and 88 as shown, the pivot rod 101 pivotally connected to a joint rod 103 such that the joint rod may pivot about a substantially vertical axis. Pivotally mounted on opposite ends of the joint rod 103 are parallel plates 105a and 105b which are rigidly connected to an end of an outrigger brace 100a and 100b. The parallel plates 105a and 105b may pivot about a substantially horizontal axis, thus allowing the outrigger brace to pivot as shown by the arrows in FIG. 10.

Figure 11:
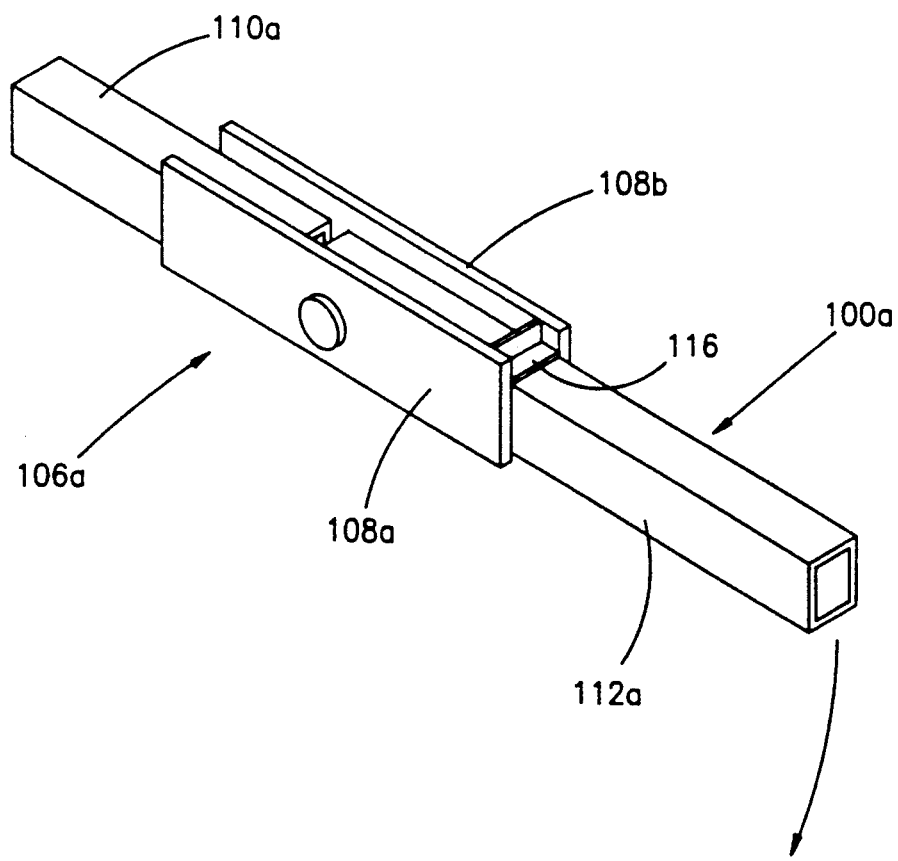
FIG. 11 is a partial perspective view of the over-center hinge mechanism in each outrigger brace.

Each of the outrigger braces 100a and 100b further includes an over-center hinge 116a and 106b which preferably allows each outrigger brace 100a and 100b to fold as shown in FIG. 1. FIG. 11 illustrates the preferred embodiment of the over-center hinge 106a. Over-center hinge 106b is substantially similar to overcenter hinge 106a. Over-center hinge 106a includes a pair of outwardly extending parallel plates 108a and 108b which extend outwardly from and are connected to a forward section 110a of an outrigger brace 100a. Pivotally connected between the parallel plates 108a and 108b is a rearward section 112a of an outrigger brace 100a, allowing pivotal motion as shown by arrow 114. To restrict the pivotal motion of the rearward section 112a, an angle iron section 116 is connected between the parallel plates 108a and 108b. The angle iron section 116 prevents the rearward section 112a of the outrigger brace 100a from aligning with the forward section 110a of the outrigger brace 100a, thus ensuring that the angle between the forward section 110a and rearward section 112a is always less than one hundred eighty degrees.

As thus described, when the left and right wing bars 58 and 60 are in transversely extended working position, the outrigger braces 100a and 100b form substantially rigid tensioning members with the over-center hinge 106a and 106b in the position shown in FIG. 11. When the wing bars 58 and 60 are moved to the forwardly folded transport position, the over-center hinge 106a and 106b allows the outrigger braces 108a and 108b to fold to accommodate the forward movement of the left and right wing bars 58 and 60, without the need for an operator to fold the hinges manually. An operator of the front folding tool carrier bar 10 may therefore operate the entire apparatus from the comfort and safety of the tractor cab.

Similarly to the left and right wing bar extensions 86 and 88, outrigger braces 100a and 100b may be lengthened or shortened to accommodate various sized implements. This is preferably accomplished by removing a section of an outrigger brace 100a and 100b, shown by the diagonal lines on the outrigger brace in FIG. 1.

Additionally, for securing the wing bars 58 and 60 and wing bar extensions 86 and 88 in front-folded transport alignment, a transport securement bar 118 may be provided which extends between and is removably connected to the forward ends of each wing bar extension 86 and 88 as shown by the dotted lines in FIG. 3.

When not in use, the transport securement bar 118 may be stored in a wing bar extension 86 and 88.

The tool carrier bar as thus described provides a substantial improvement over the prior art. An operator of the tool carrier bar need only leave the cab of the tractor at infrequent intervals, specifically when attaching the tool carrier bar 10 to the tractor or when raising the tool bar supports 78a and 78b. Otherwise, an operator may remain in the tractor cab while using the present devise, thus greatly increasing the safety and efficiency of use of the device.

There has thus been shown and described an invention which satisfies at least all of the stated objects.

I claim:

1. A front folding tool carrier bar for agricultural applications, said bar comprising;

a frame having opposite sides and having ground-engaging wheels mounted thereon;

means for coupling said frame to a vehicle, said means for coupling mounted on said frame;

a pair of forwardly folding wing bars having first and second ends, each of said first ends pivotally mounted on said frame such that said wing bars may pivot about a substantially vertical pivot axis, between a forwardly folded transport position and a transversely extended working position;

said wing bars pivotally mounted at opposite sides of said frame;

a pair of outrigger braces extending outwardly from said frame, pivotally mounted on said frame forwardly of said wing bars, one brace pivotally connected to each wing bar whereby said wing bars may be braced in said working position;

said outrigger braces further comprising pivot joints for mounting said braces to said frame and said wing bars;

said pivot joints each further comprising means for allowing pivotal motion of an outrigger brace attached thereto about a substantially horizontal pivot axis and means for allowing pivotal motion of an outrigger brace attached thereto about a substantially vertical pivot axis whereby said braces may be pivoted about said axes;

each of said outrigger braces further comprising at least one over-center hinge formed in each brace such that each outrigger brace acts as a rigid tensioning member when said wing bars are in said working position, and each outrigger brace may be folded in response to said wing bars pivoting from said working position to said transport position;

at least one ground-engaging wheel mounted on each wing bar; and means for pivoting said wing bars between said transport position and said working position.

2. The forward folding tool carrier bar of claim 1 wherein said means for coupling said frame to a vehicle further comprises a quick-attach coupling mechanism comprising one or more generally V-shaped notches formed at an end of said frame and one or more bar stops pivotally mounted on a forward end of said V-shaped notches such that said notches may receive a push bar of a vehicle and said bar stops may engage said push bar retaining the push bar within said V-shaped notches.

3. The front folding tool carrier bar of claim 1 wherein each of said wing bars further comprise an outer section and an inner section, said inner section pivotally mounted on said frame, said outer section pivotally mounted on said inner section.

4. The front folding tool carrier bar of claim 1 wherein said means for pivoting said wing bars further comprises a pair of hydraulic cylinders extending between and connected to said frame and said wing bars, one cylinder coinected to each wing bar.

5. The front folding tool carrier bar of claim 4 wherein said connections between said cylinders and said wing bars each comprise an L-shaped strut and a support bar, said strut and said support bar pivotally connected to said cylinder and rigidly connected to said wing bars, whereby movement of said wing bars may be facilitated.

6. The front folding tool carrier bar of claim 1 wherein said frame and said wing bars further comprise a vertical adjustment mechanism whereby the distance between the ground and said wing bars may be adjusted.

7. The front folding tool carrier bar of claim 6 wherein said vertical adjustment mechanism further comprises at least one parallelogram type linkage mounted on each wing bar and a central parallelogram type linkage mounted on said frame such that said second ends of said wing bars may be raised or lowered in unison with said first ends of said wing bars.

* * * * *